United States Patent [19]
Ahamed et al.

[11] Patent Number: 5,809,493
[45] Date of Patent: Sep. 15, 1998

[54] KNOWLEDGE PROCESSING SYSTEM EMPLOYING CONFIDENCE LEVELS

[75] Inventors: Syed Vickar Ahamed; Victor Bernard Lawrence, both of Holmdel, N.J.

[73] Assignee: Lucent Technologies Inc., Murray Hill, N.J.

[21] Appl. No.: 657,924

[22] Filed: May 31, 1996

Related U.S. Application Data

[60] Provisional application No. 60/009,487 Dec. 14, 1995.

[51] Int. Cl.⁶ .................................................. G06F 17/00
[52] U.S. Cl. .............................................................. 206/52
[58] Field of Search ........................................ 395/61, 75

[56] References Cited

U.S. PATENT DOCUMENTS

| | | | |
|---|---|---|---|
| 4,868,763 | 9/1989 | Masui et al. | 395/11 |
| 4,920,499 | 4/1990 | Skeirik | 395/12 |
| 5,208,898 | 5/1993 | Funabashi et al. | 395/50 |
| 5,257,185 | 10/1993 | Farley et al. | 395/10 |
| 5,282,265 | 1/1994 | Suda et al. | 395/12 |
| 5,307,446 | 4/1994 | Araki et al. | 395/77 |
| 5,386,498 | 1/1995 | Kakefuda | 395/75 |
| 5,418,943 | 5/1995 | Borgida et al. | 395/604 |

*Primary Examiner*—Allen R. MacDonald
*Assistant Examiner*—Jeffrey S. Smith

[57] ABSTRACT

A knowledge processing system includes a memory for storing knowledge in a plurality of knowledge modules in a knowledge bank, in which the knowledge includes data associated with pre-existing solutions to previous problems; and a processing unit, operating knowledge-based software, and including a knowledge processing unit for generating a plurality of artificial intelligence based modules, and for executing the plurality of artificial intelligence base modules to process input data, including problem related data, for generating a plurality of solution-related modules from the data representing the pre-existing solutions, with the solution-related modules corresponding to solutions to the current problem; a numerical processing unit for generating a confidence level associated with a respective solution to the current problem; and a database processing unit for controlling the storing of the solution-related modules in the memory. The knowledge processing unit responds to the confidence levels of the solutions to iteratively revise the solutions to generate an optimal solution to the current problem.

20 Claims, 5 Drawing Sheets

KNOWLEDGE PROCESSING SYSTEM EMPLOYING CONFIDENCE LEVELS

This application claims priority to U.S. Provisional Application No. 60/009,487 filed on Dec. 14, 1995.

BACKGROUND INFORMATION

1. Technical Field

This disclosure relates to information processing, and in particular to a processor unit for use in knowledge processing.

2. Description of the Related Art

Knowledge processing has been an integral part of knowledge engineering since the early 1980s. Concepts from knowledge engineering have matured into well accepted disciplines such as artificial intelligence, expert systems, pattern recognition, computer vision, robotics, etc. Such disciplines provide a framework for engineers to design and build automated computer-based response-systems.

For example, expert systems provide a user with an opinion or approximation thereto of one or more experts in the field, based on stored expertise, as such experts may respond to the query of the user. Such expert opinions are generated generally from a knowledge base organized as an ultra-large and sophisticated data structure. Queries having sufficient details and precision allow an expert system to generate a response substantially similar or even identical to the response which the expert would have provided. General queries may receive broad shallow information, and specific queries may receive precise information. Thus knowledge or information may be engineered to satisfy users in a variety of situations.

In another example, for computer vision applied to a medical environment, blood samples may be drawn from patients and scanned for certain types of cells with specific structure. Such scanning may be automated, for example, by presenting and/or digitizing a microscope image on a computer screen to generate pixels in which the cell boundaries form dark pixels. A computer may then see and/or detect such boundaries and also detect if such boundaries match the boundaries of specific cells which may be expected or not expected from specific types of patients. A computer may be trained to match patterns at an elementary level, and to see images as in computer vision at an advanced level.

Both pattern matching and computer vision may employ both mathematical and heuristic methods, since the match may be less than perfect and detected attributes may not be exactly what the computer was programmed to find. Degrees of uncertainty and lack of precision may accrue, so the application of probability and confidence levels has been developed in these disciplines.

Computer-generated results which verge on being valid, for example, about 90% or 95% of the time are generally better than having no results at all. In providing such knowledge processing, computers using knowledge processing techniques and associated knowledge functions, such as knowledge modules and subroutines, are finding greater acceptance in society, such as medical and business applications. Computer systems dedicated to performing well accepted functions routinely such as identifying the bar code in grocery stores or voices in voice activated systems are presently becoming common occurrences.

For effective knowledge processing, it is understood that a knowledge processing system should address three basic notions of knowledge: that knowledge is based on concepts, that events enhance or refute such concepts, and that no concept or modifications thereof is absolute. Heretofore, knowledge processing systems have not fully recognized these three notions of knowledge; in particular, knowledge has been treated as absolute and thus deterministic.

SUMMARY

It is recognized herein that a knowledge processing system should be aware of current events that are modifying an underlying knowledge base with some finite probability of accuracy in the results of knowledge reasoning.

A knowledge processing system is adapted to store and retrieve information as knowledge using database facilities, to intelligently process such information using artificial intelligence (AI) techniques, and to compute confidence levels using previously stored knowledge processing steps and probability theory, including fuzzy logic and fuzzy set theory, to numerically compute and/or estimate accuracies associated with each discrete knowledge processing step.

The knowledge processing system processes knowledge in the knowledge domain to generate incremental and integrated conclusions, and in the numerical domain to generate confidence levels. The knowledge processing system includes a memory for storing knowledge in a plurality of knowledge modules in a knowledge bank, in which the knowledge includes data associated with pre-existing solutions to previous problems; and a processing unit, operating knowledge-based software, and including a knowledge processing unit for generating a plurality of artificial intelligence based modules, and for executing the plurality of artificial intelligence base modules to process input data, including problem related data, for generating a plurality of solution-related modules from the data representing the pre-existing solutions, with the solution-related modules corresponding to solutions to the current problem; a numerical processing unit for generating a confidence level associated with a respective solution to the current problem; and a database processing unit for controlling the storing of the solution-related modules in the memory. The knowledge processing unit responds to the confidence levels of the solutions to iteratively revise the solutions to generate an optimal solution to the current problem.

BRIEF DESCRIPTION OF THE DRAWINGS

The features of the disclosed knowledge processing system and method will become more readily apparent and may be better understood by referring to the following detailed description of illustrative embodiments of the present invention, taken in conjunction with the accompanying drawings, in which.

DESCRIPTION OF THE PREFERRED EMBODIMENTS

Figure 1:
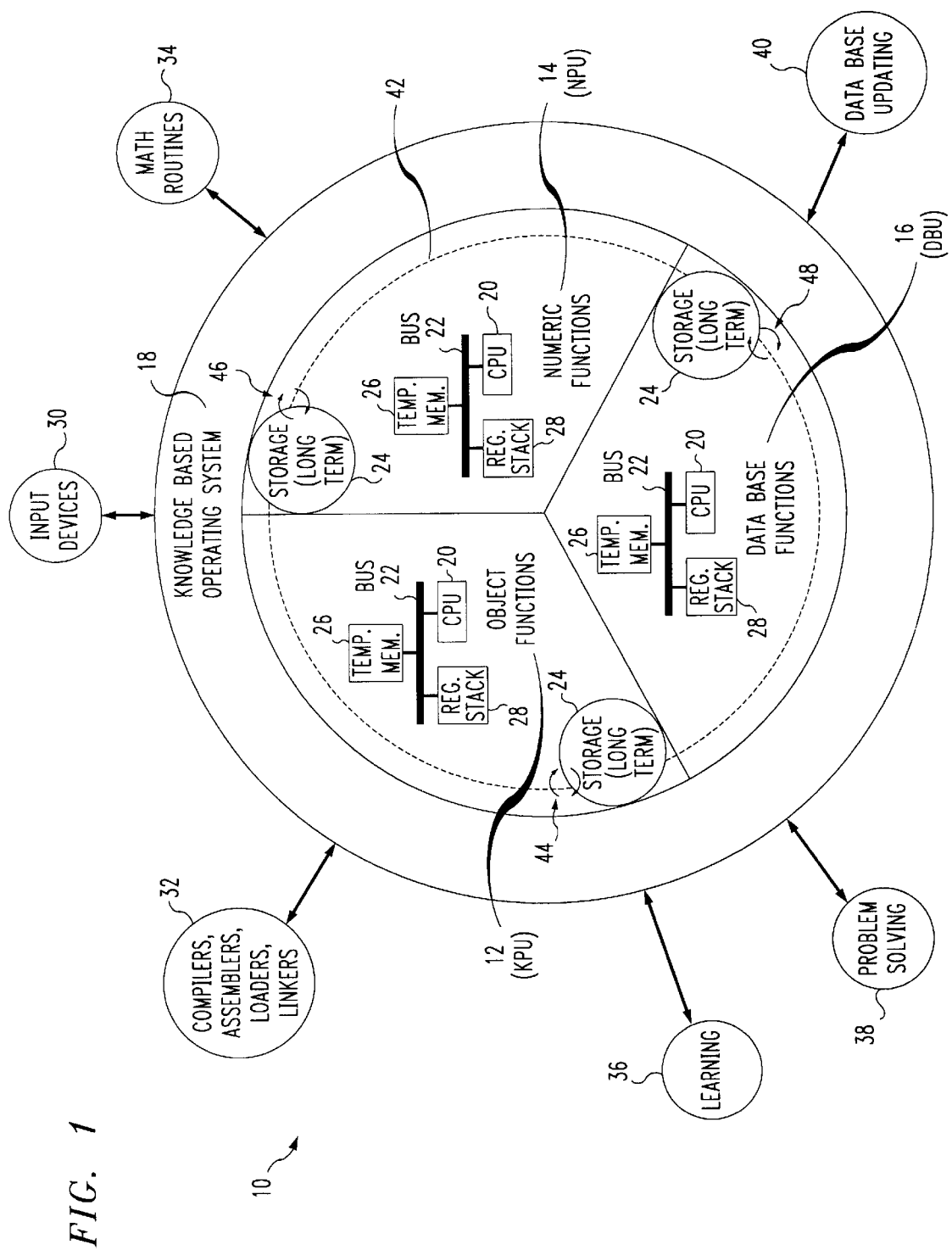
FIG. 1 is a block diagram of the disclosed knowledge processing system.

Referring now in specific detail to the drawings, with like reference numerals identifying similar or identical elements, as shown in FIG. 1, the present disclosure describes a knowledge processing system 10 and method for performing knowledge processing with associated confidence levels for the knowledge processing steps.

It is to be understood that references to a "user" with reference to a person, an individual entity, a personal computer, personalized intelligent networks, object, goals, agendas and plans, etc. are also applicable to groups of people, organizations, nations, societies, etc.

For clarity of explanation, the illustrative embodiments of the disclosed knowledge processing system and method are presented as having individual functional blocks, which may include functional blocks labelled as "processor" and "processing unit". The functions represented by these blocks may be provided through the use of either shared or dedicated hardware, including, but not limited to, hardware capable of executing software. For example, the functions of the processor and processing unit presented herein may be provided by a shared processor or by a plurality of individual processors. Moreover, the use of the functional blocks with accompanying labels herein is not to be construed to refer exclusively to hardware capable of executing software. Illustrative embodiments may include digital signal processor (DSP) hardware, such as the AT&T DSP16 or DSP32C, read-only memory (ROM) for storing software performing the operations discussed below, and random access memory (RAM) for storing DSP results. Very large scale integration (VLSI) hardware embodiments, as well as custom VLSI circuitry in combination with a general purpose DSP circuit, may also be provided. Any and all of these embodiments may be deemed to fall within the meaning of the labels for the functional blocks as used herein.

As shown in FIG. 1, the knowledge processing system 10 uses a processor for implementing a knowledge processing unit (KPU) 12, a numeric processing unit (NPU) 14, and a database unit (DBU) 16, which may be represented as three adjacent sectors of a circular whole. The KPU 12 provides knowledge-based functions, such as object or goal-based functions. The NPU 14 provides numeric functions, including calculations and/or estimations of the probability that a particular processing step executed by the KPU 12 and/or a combined probability of a plurality of steps executed by the KPU 12 for a particular knowledge-based task are accurate. The DBU 16 provides data storage and retrieval functions. In an illustrative embodiment, the KPU 12 and the NPU 14 are separate computer processing units that are operatively connected together, as described in greater detail below, and the DBU 16 is operatively connected to and provides functions for both the KPU 12 and the NPU 14.

The intertwined character of micro-functions in the knowledge domain is decomposed into database access of participating objects, object manipulation, and computation of the certainty of knowledge instructions to be executed, including fuzzy or "not-so-sure" functions applied to the knowledge instructions. Incremental certainty is applied to each step, and the certainty of the overall problem solving process is determined since the final conclusions or solutions are achieved after a large number of such incremental knowledge instructions. The NPU 14 tracks the dependability of steps which yield new knowledge prior to the execution of a current knowledge instruction. The weakest link in any chain of rationality or reasoning which leads to a subconclusion or the final conclusion may be readily identified and reinforced, if necessary, as the certainties of the knowledge instructions and overall reasoning are determined.

The DBU 16 has a front-end interface to permit protocol conversion and decoding of arriving data packets, such as SS7 packets, and other non-standard yet acceptable protocol structures. In one embodiment, a bank of CPUS is employed, and every data access operation is associated with a call-processing identifier or task. Once the exact nature of the desired function is determined, a command is dispatched to a large disk drive store/retrieve system. The data themselves are retrieved and stored via a direct memory access (DMA) data bus and brought to and from the memory. The DMA bus quickens the control and access process considerably. If the databases are logically or physically separated, then the access can be further increased by accessing each field of a data query in parallel. Hence, databases which store inter-related blocks of information as objects and their numerous fields or attributes may be designed to function quickly and inexpensively as memory modules.

In large databases with constant updating and modification, the database itself needs management. Macro database functions use a localized CPU to complete the task. The localized CPU is dedicated to database functions much like an input/output (I/O) processor is dedicated to I/O functions. In addition, disk buffering generally needs its own local memory. This memory is dedicated to database functions much like a conventional cache memory is dedicated to CPU functions.

In the disclosed knowledge processing system 10, the DBU 16 may operate independently and remotely, and executes its own stand-alone functions based upon assembly-level commands it receives from the KPU 12 and the NPU 14. When problems are input to the knowledge processing system 10, corresponding software modules are generated for use by the KPU 12. The software modules may be objects in object oriented programming languages and may have associated databases. Objects and their attributes may be far more numerous and complex than the numbers used in numerical programs, for example, since hyper-spatial complexity is routine in human or goal transactions or events. The representational format of generalized objects and the representation of their attributes may be highly variable. The DBU 16 manages objects and their attributes using data and module management application programs for handling procedures, objects and their attributes, since such objects may become too numerous and too varied for prior operating system routines which perform page replacement algorithms from disk to memory and vice-versa.

The NPU 14 tracks and stores confidence levels associated with each individual knowledge microfunction corresponding to solutions or part thereof to previous problems, and tracks and stores the cumulative confidence level in all operations thus far into the knowledge program execution, with both individual and cumulative confidence levels reflecting certainty and uncertainty in the reasoning. In addition, the NPU 14 tracks the weakest reasoning by the lowest value of the individual confidence levels. Ideally, the confidence levels of the knowledge microfunctions approaches unity. In one embodiment, the NPU 14 includes a multiplier which evaluates the product of all the individual confidence values. In another embodiment, the NPU 14 utilizes nonlinear and complex functions to compute the confidence values, such as fuzzy set theory using, for example, clustering techniques and center-of-gravity determination of the confidence levels.

A DBU software program or an equivalent hardware implementation is used to control disk memory access; disk and memory management; address tracking and translation of objects; object attributes; program procedures to associate or disassociate, enhance or curtail, modify or truncate attributes, etc.; and library/utility routines. Such DBU software programs may be applications written in advanced object oriented programming languages known in the art.

Each of the KPU 12, the NPU 14, and the DBU 16 includes a respective central processing unit (CPU) 20 operatively connected to a respective bus 22, a long term storage unit 24, a temporary memory 26, and a register stack 28. Such components of each of the KPU 12, the NPU 14, and the DBU 16 performs the respective functions of the units 12–16; i.e. functions on a knowledge domain, a numerical domain, and a database domain, respectively. Such components may also be shared with distinct operations performed by software for performing such knowledge, numeric, and database functions, respectively.

In an illustrative embodiment, the KPU 12 may include a microprocessor such as the "PENTIUM" microprocessor available from "INTEL" Corporation; the NPU 14 may include a numerical processing system, microprocessor, and/or customized numerical processors; for example, math coprocessors available from "INTEL" Corporation; and the DBU 16 may include a microprocessor or server for maintaining a database, such as a database available from "ORACLE" Corporation.

An operating system 18 is provided to interface the units 12, 14, 16 to other devices such as input devices 30, as well as specific hardware and/or software 32 for providing data and command compilers, assemblers, loaders, and linkers. The operating system 18 may also operatively connect the units 12–16 to software modules 34–40 for providing math routines, learning functions, problem solving functions, and database updating routines, respectively.

The units 12–16 may primarily or solely access such modules 34–40 depending upon the primary function of the respective units. For example, the KPU 12 may access the learning module 36 and the problem solving module 38, while the NPU 14 accesses the math routines 34, and the DBU 16 accesses the database updating module 40. The units 12–16 may exchange data as needed using a common bus 42; for example, the common bus 42 may be operatively connected by access points 44–48 to the respective storage devices 24 of the units 12–16.

The operating system 18 may be knowledge-based; for example, the operating system 18 may include AI modules for identifying and processing data and commands and for executing application programs and the modules 34–40 associated with each of units 12–16, respectively. The operating system 18 includes operator-operand functions based on a knowledge base of the user and available in a database or knowledge bank for dealing with humanistic and human situations. In an illustrative embodiment, the knowledge processing system 10 and operating system 18 may be implemented in hardware and/or software in a manner as described in commonly assigned U.S. application Ser. No. 08/656,539, entitled PERSONAL COMPUTER-BASED INTELLIGENT NETWORKS, filed May 31, 1996, which is incorporated herein by reference.

In the illustrative embodiment, the knowledge processing system 10 is a personal computer, and alternatively may be implemented using a workstation or a terminal operatively connected to a mainframe. For such implementations, the knowledge processing system 10 may include a processor, memory, stored programs including an interactive computer program, an input device, and an output device, with each of the components incorporated, for example, on the main motherboard operatively connected to plug-in boards.

In one embodiment, the knowledge processing system 10 is a SPARC workstation available from Sun Microsystems, Inc. having about 10 MB associated RAM memory and a hard or fixed drive as memory, which operates using the UNIX operating system to run application software as the stored programs providing programs and subroutines implementing the knowledge processing system 10 and method.

The knowledge processing system 10 receives commands and input data from the input device 30 which includes a keyboard, a mouse, and/or a data reading device such as a disk drive for receiving the data in input data files from storage media such as a floppy disk or an 8 mm storage tape. The received data are stored in memory for further processing to generate knowledge-based outputs. In addition, through the input device 30, the user can select commands using the mouse.

The generated knowledge-based outputs are sent to the output device such as a display for display thereof. Alternatively, the output device may include specialized graphics programs to convert the generated data to displayed graphics. In additional embodiments, the outputs may be listed in a file for output as columns or tables of text by the output device which may be a display or a hard copy printer.

The knowledge processing system 10 performs knowledge processing application programs and subroutines which are implemented from compiled source code in the FORTRAN and/or the C programming languages. It is understood that one skilled in the art would be able to use other programming languages such as C++, as well as object oriented programming, to implement the knowledge processing system 10 and method.

Using adaptive and dynamic knowledge processing application programs and subroutines, the knowledge processing system 10 may be customized for individual users to operate as a personalized intelligent network (PIN) to liberate the human mind to pursue truly creative functions. In this manner, the architecture of a typical personal computer is adapted to process, learn and remember, switch and access, and carry out routine input/output (I/O) functions for accomplishing AI-switching point/service transfer point-type processing/routing; compact disk read only memory (CD ROM) and disk-based DBMS (service control point) memory and lookup; time-division multiplexing (TDM) bus-control-based access (service switching point) type switching; and routine knowledge input/output functions.

In implementing a personal processing unit (PPU) the knowledge processing system 10 employs both cache and main memory to process the knowledge needs of users; for example, the memory of the knowledge processing system 10 stores executable programs for macro-procedures derived from standard and routine transactions of users in their private and personal lives; for example, the various financial, taxes, medical, educational, checking, social, and relative-based transactions may be programmed in a manner known in the art. Such knowledge processing may be performed in a manner as described in commonly assigned U.S. Pat. No. 5,465,319, issued Nov. 7, 1995, which is incorporated herein by reference.

In the illustrative embodiment, the knowledge processing system 10, implementing a PPU, generates a sequence of AI modules and/or functions to solve a current problem or situation in view of the past history of solutions to similar or identical problems. Unique situations are alerted to the user and the uniqueness is identified.

The knowledge processing system 10 then executes the sequence of the AI functions to yield an actual solution to the current problem, as described below. The knowledge processing system 10 may also be optimized to perform a first high-level compilation of the AI functions to generate AI-oriented modules or subroutines, and then to execute the subroutines. The modules may be generated as objects for object oriented programming and processing.

Figure 2:
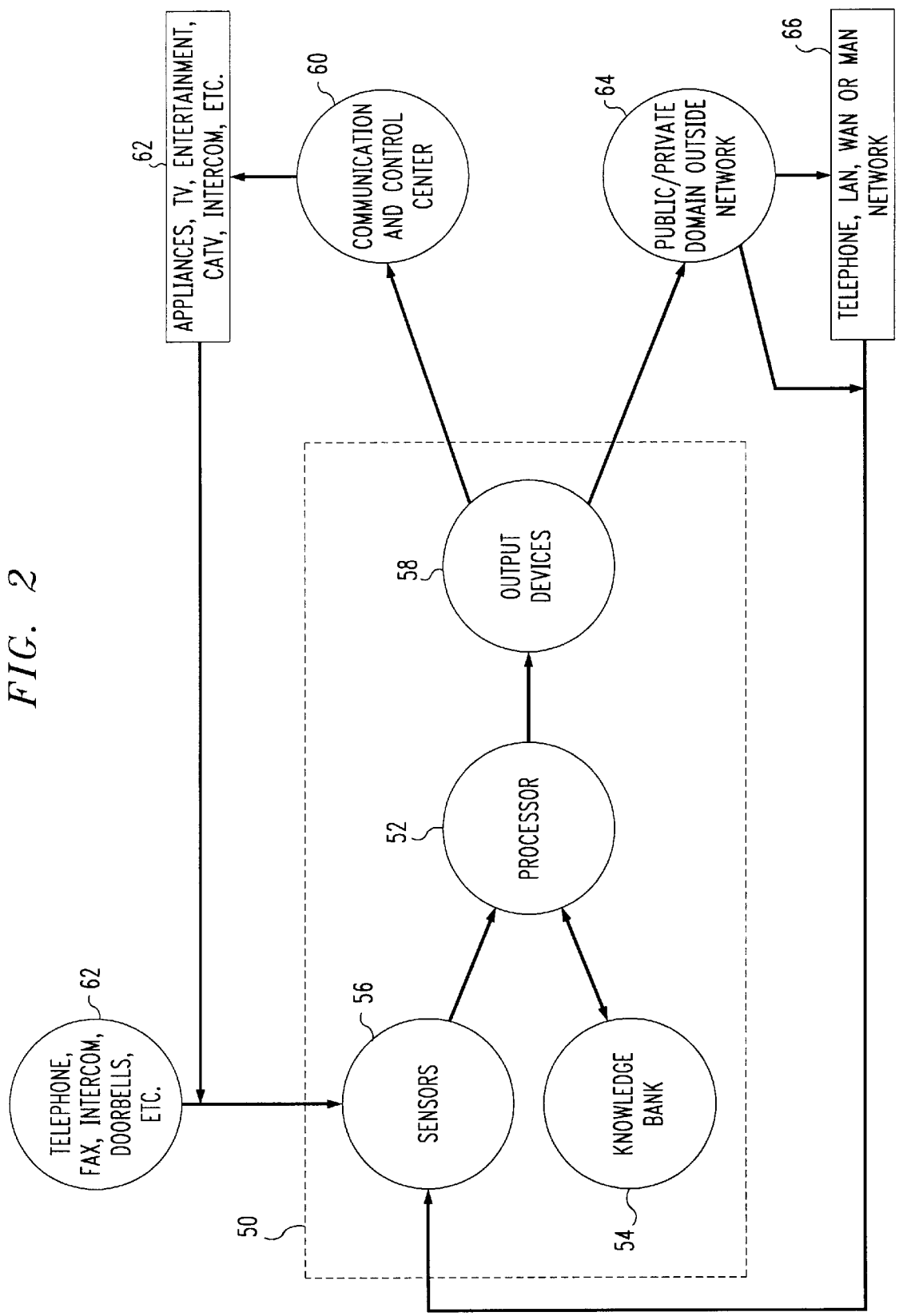
FIG. 2 is a block diagram of the knowledge processing system in a network configuration.

As shown in an illustrative embodiment in FIG. 2, the knowledge processing system 10 may be configured as a network 50, such as a personalized intelligent network (PIN), which is implemented in hardware and/or software by at least one processing unit. The network 50 includes knowledge-based memories, AI-based processors, customized local access special services (CLASS) based dispersed networks, and stimulus-response based I/O devices.

The processor 52, knowledge bank 54, sensors 56, and output devices 58 of FIG. 2 correspond to the processor, memory, and input and output devices which may be embodied as described above with reference to the knowledge processing system 10. In particular, the processor 52 may be an object oriented processor capable of processing objects programmed in objected oriented programming languages using, for example, Object Linking and Embedding (OLE) protocols.

The sensors 56 and other input devices provide input data signals to the processor 52 to be processed by the PPU of the knowledge processing system 10 using stored experience/knowledge available in the knowledge bank 54. The processor 52 then generates output signals for use and/or output by the output devices 58. For example, data may be output as audio or video messages to the user, as data to other computer systems, or as control signals to allow the network 50 to gain control of external devices through the external command and control center 60.

In one embodiment, the command and control center 60 may be a centralized unit operatively connected to other devices 62 such as appliances, telephone answering machines, telephone call initiators, doorbells, thermostats, televisions, intercom systems, cable television units, other personal computers, other entertainment systems, etc. within a house or connected through other networks 64 such as private or public domain networks which may include and/or be connected to other external systems 66 such as telephone systems, local area networks (LANs), wide area networks (WANs), medium area networks (MANs), etc.

The devices 62, networks 64, and external systems 66 may also be connected back to the sensors 56 for providing interactivity with the network 50 to complete the social and data interactions of the network 50 with other users, computer systems and networks, robots, other PINs, etc. The response of the network 50 to external data may be a one-step process or may be more complex, since the network 50 monitors the data and responds to data as appropriate by generating an intelligent set of macros to perform a specific function. For example, upon receiving a temperature reading through the sensors 56, the network 50 may respond by generating a control signal or robotic software macro for output through an output device 58 and the communication and control center 60 to a thermostat included in devices 62 to adaptively and intelligently control the thermostat. Feedback is established through sensors 56, and the PIN 50 may thus learn how to adjust a thermostat to an optimal, predetermined, or preferred temperature. The monitoring of recent and current tasks and activities is retained in short-term memory in the knowledge banks 54 of the network 50. After learning a task to generate task-oriented software modules, such as adjusting a thermostat, the software modules may be stored in long-term memory of the knowledge bank 54 as a learned task.

For the knowledge processing system 10 implementing the network 50 in a personal computer of a single user, the knowledge bank 54 may be embodied as a disk-oriented service control point (SCP), with user information stored therein and accessible by a data-base manager. The knowledge processing system 10 may seek and access data germane to the goals or objects to solve a current problem, for example, using techniques such as forward, backward and indirect pointers to and from objects, and may associate objects from a history of associations. The knowledge processing system 10 may use a hard drive in conjunction with other data storage techniques such as compression and multiple storage media such as floppy disks and tape drives to store the knowledge banks 54.

processing in the knowledge domain is based upon three notions. First, any complex knowledge domain function may be decomposed into a series of smaller programmable micro functions. Second, the solution of complex problems has some identifiable pattern or programmable structure that follows a sequence of steps; i.e. a group of programmable micro functions may be identified and executed in an adaptive sequence to accomplish any complex knowledge domain function. Third, every operation code in the knowledge domain is a system-realizable knowledge domain function.

Knowledge processing causes the modification and/or enhancement of concepts. Concepts are abstract, but the treatment of concepts as objects or goals with attributes permits a degree of quantification. Objects may be stored in predetermined segments of memory such as 64 bit words, with each word being, for example, 32 bits long, to store associated attributes, identifiers, forward and backward pointers, etc. A given set of objects with their initial attributes forms the input to the knowledge processing system 10. The output is either the same set of objects, or a derived set of objects with modified set of attributes. Knowledge processing thus causes interactions among objects and goals, and yields the attributes of each object from the object set during each micro step in the knowledge processing. In addition, the level of confidence in the micro function and in the entire set of functions are also evaluated.

The KPU 12 is dedicated to the execution of assembly-level knowledge instructions that may be called "binary knowledge instructions" or "knowledge micro-instructions". In a conventional processor, a micro-instruction has two essential parts: an operation code (opcode) and one or more operands. In the KPU 12, micro-instructions are extended to the knowledge domain, in which a knowledge micro-instruction includes a knowledge-based operation code, which may, for example, be a 64 bit instruction in a predetermined operation mapping or repertoire defined herein as a knowledge opcode or kopcode, and one or more objects or goals defined herein as knowledge operands upon which a kopcode operates.

Kopcodes may be classified as one of two types: a real kopcode and a pseudo kopcode. The real kopcode performs a definite knowledge domain function or microfunction on objects or goals. The pseudo kopcode retrieves attributes of objects, retrieves forward or backward pointers, and/or performs other operations to prepare the KPU 12 for upcoming real kopcodes.

An example of a pseudo kopcode is when the system exchanges one object for another to find a closer match of the attributes or when the system searches a database to find the locality of the most common occurrence of an object.

Other categories of real kopcodes include: single object kopcodes, multiple object kopcodes, single object attribute-related kopcodes, multiple object attribute kopcodes, antecedent single object kopcodes, precedent single object kopcodes, antecedent multiple object kopcodes, precedent multiple object kopcodes, memory-oriented search opcodes, database oriented search opcodes, network-oriented search opcodes, etc.

Using kopcodes and knowledge operands, real assembly-level instructions in the KPU 12 execute incremental knowledge domain functions on or from the knowledge operands. For an input problem, the functions of the KPU 12 manipulate and/or interpret objects in view of a particular set of events determined from the definition or the context of a problem to be solved. Through kopcodes, the KPU 12 categorizes, matches, infers, extends, analogizes, recognizes, etc. events based upon the situation or upon the problem which the system is attempting to solve in view of previous information stored in the databases 24 of the knowledge processing system 10.

During the processing of knowledge, the definition of a problem to be solved may be vague and the scope of the solution may be considerably wider than the confines of numerical data. Concepts, their enhancement and their modification may be error ridden, reluctant and uncertain. Reluctance and hesitation in inference generation may be characterized by a certainty factor in the solution of a problem. At the global level, this certainty factor may approach 100 percent in numerical data processing, and it should generally be less than 100 percent in knowledge processing. If a system is required to solve a knowledge-based problem with 100 percent certainty, then the knowledge processing system 10 may fail unless the problem is completely defined and it is strictly logical and/or numeric. Even under such conditions, truncation and approximations often cause inaccuracies.

In most conventional numerical processors, the solution to a problem should have a 100 percent confidence level, since there is no ambiguity in the execution of an operation code on numerical operands at the binary level, and the solution is no more than a compiler-generated assembly of binary level instructions. Thus, traditional von Neumann computers are relatively simple devices that sequentially execute instructions associated with a program. Results are numeric/logical outputs of an arithmetic-logic unit obtained from program execution.

The disclosed knowledge processing system 10 initially assigns a confidence level greater than the lowest level acceptable to the user for the solution of similar problems. The knowledge processing system 10 then strives to present a solution or all feasible solutions which exceed this initial level. The NPU 14 performs regular checking of the confidence levels of the knowledge processing steps to attain a final or predetermined minimal confidence level. Such checking of confidence levels is generally a strictly numeric process.

When the KPU 12 is processing knowledge, every intermediate step or conclusion reached is assigned a confidence level by the NPU, and a cumulative level of confidence in all steps is updated at the conclusion of every micro knowledge instruction handled by the KPU 12. The knowledge processing system 10 thus generates knowledge domain results and also gives a numeric indication of how confident it is about those results. At two extremes, it can generate infinitely large numbers of irrelevant "solutions" with zero confidence level or no solution at all with an absolute 100 percent confidence level. If the confidence value is preset at some reasonable level, the knowledge processing system 10 yields or strives to yield acceptable solutions. The acceptable solution may also be required to satisfy additional economic criteria such as minimum expected cost, risk, etc., or maximum expected profit, sales, etc., input by the user. Thus the system offers numerous solutions with composite traits and consequences rather than a single solution.

Generation of new knowledge by the processing of earlier knowledge differs from the generation of a new number from previous numbers. Arithmetic and logical functions on operands in the numerical domain are replaced by learning, deductive and inductive relationships between objects in the knowledge domain. Once a deduction/inference is drawn, it needs to be appropriately "recycled" in other contexts, for example, to be used as a basis for further inferences. Further, there is no certainty that an inference is correct and that it has been correctly used in the new context. For this reason, in the present disclosure, two numbers are used to indicate confidence levels of (1) correct information and (2) correct use in context. The NPU 14 keeps track of the level of certainty of each knowledge processing step. Every knowledge instruction has two associated numbers: the confidence level in the particular leaning/deduction itself, and the application of the learned/deduced knowledge to the objects being processed. Both of these numbers are obtained from input, previous experience or the best estimate thereof, and lead to the numerical result of the confidence level of each knowledge instruction.

In conventional computers, a typical CPU cycle includes four major operations: fetch, decode, execute, and store away the results as a binary number for later use. Every CPU cycle executes one part of a system instruction, and program execution includes executing each system instruction in a generated sequence after compilation and assembly of the program. The execution of system language instructions in the hardware leads to the results which the programmer had envisioned. Execution may be sequential, parallel or pipelined.

In the knowledge processing system 10, information is defined as knowledge about objects, object classification and inter-relationships; about their attributes, attribute classifications and inter-relationships; about events, event classifications and inter-relationships; about kopcodes, knowledge functions of the kopcodes and inter-dependencies; about pseudo kopcodes, their knowledge domain assembler instructions and their inter-dependence; and knowledge macros, their macro knowledge domain functions and inter-dependence. Recursion of objects and procedures may be performed, and new information is an incremental result obtained from old information.

The knowledge processing system 10 manages information by considering such information as being neither created (i.e. deduced) nor destroyed (i.e. lost or forgotten) with absolute certainty. As a corollary, all such information has a discrete level of confidence, ranging from 0 to 1, inclusive, in the knowledge domain from which the information was derived.

In addressing an input problem received from input devices, the knowledge processing system 10 operates in two distinct modes: a solve mode for solving a problem at hand, and a learning mode for learning new knowledge. In the solve mode, learned knowledge is used to develop knowledge in a new context. In both the solve mode and the learning mode, the KPU 12 follows a sequence of operation similar to the traditional CPU sequence; i.e. fetch, decode, execute, and store away the new knowledge learned for later use.

In the solve mode, the kopcodes are distinct from the kopcodes in the learn mode. The learn mode kopcodes extract information from the object operands of a knowledge instruction, and the solve mode kopcodes obtain new knowledge resulting from the instruction upon the object operands. The solve mode and learning mode perform reciprocal functions but do so in the knowledge domain. Typically, the result of the execution of a solve mode kopcode is new knowledge having an associated a number or value indicating a confidence level in the validity of the kopcode instruction. Accordingly, new information or knowledge and an associated number result from the execution of kopcodes.

procedural learning is also performed by the knowledge processing system 10, in which a micro kopcode or a macro kopcode in a sequence of knowledge instructions is learned from the previous, similar, or a pattern of previous instructions.

Figure 3:
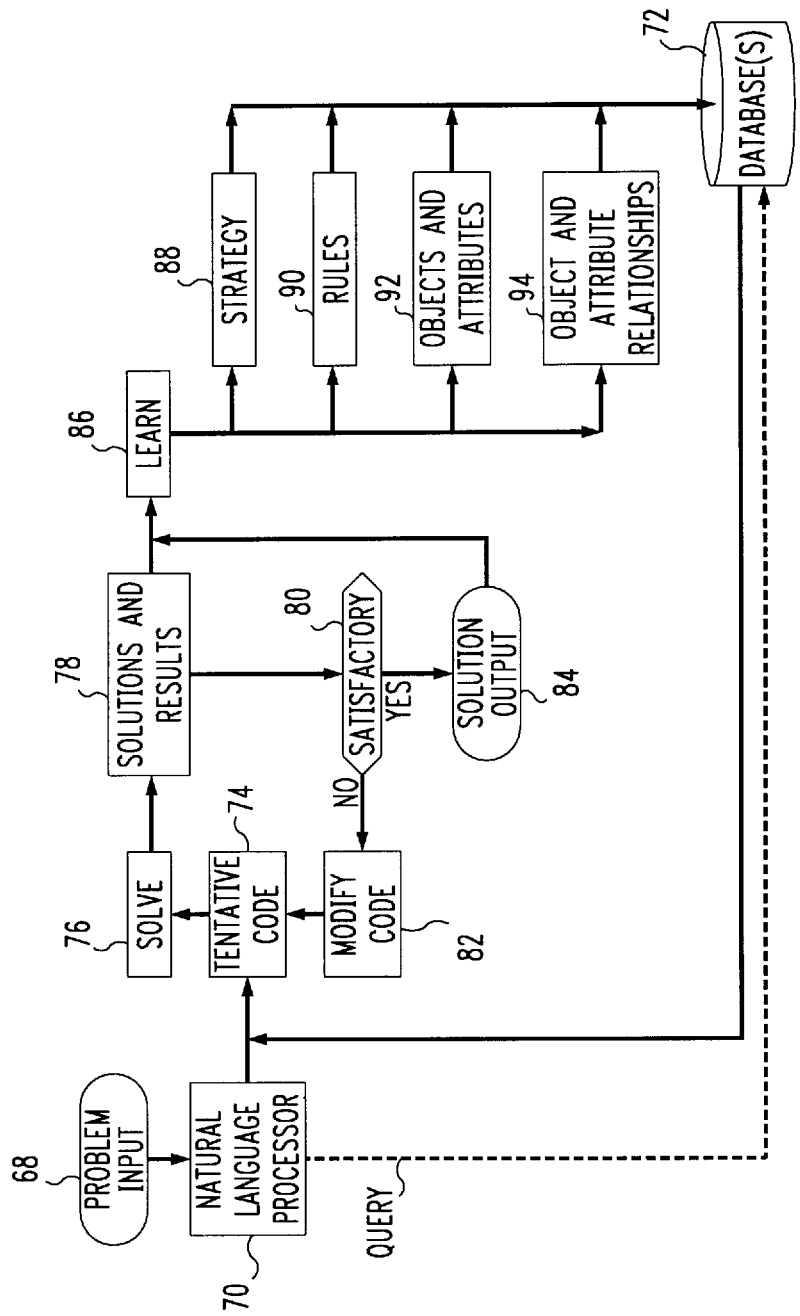
FIG. 3 is a flow diagram of the operation of the knowledge processing system.

As shown in FIG. 3, the knowledge processing system 10 executes knowledge programs and kopcodes and also learns from outside information and its own programs. When a specific program is input; i.e. posed, in step 68, a natural language processor of the KPU 12 identifies the objects and their attributes participating in a set of events in step 70. If a goal-directed problem is posed, the knowledge processing system 10 identifies subgoals, builds a solution-tree and develops a series of knowledge macros or modules representing events from past experience as previous solutions by sending a query to access the database 24 in step 72 for such previous solutions. The knowledge processing system 10 then generates initial or tentative code in step 74, which is processed to solve the problem in step 76 by applying such previous solutions, and to generate solutions and results stored in a solutions database in step 78, which includes generating software modules corresponding to the solutions and results, and generating associated confidence values for the solutions and results. In step 78, the KPU 12 is solving a knowledge problem; i.e. the KPU 12 is ascertaining the effects of the set of events upon a group of objects of a current problem or subgoal and associated confidence values stored in the memory 24 of the KPU 12 by applying the software modules to the group of objects.

The knowledge processing system 10 then determines if the solution is satisfactory in step 80; for example, if a predetermined confidence level is met, such as a 90 percent level associated with the solution. If the solution is not satisfactory, the knowledge processing system 10 then modifies the code in step 82 to generate new tentative code in step 74, and steps 74–82 are iteratively processed until a satisfactory solution is determined according to step 80. The KPU 12 may include a loop termination feature, such as an interrupt procedure, for preventing an infinite loop. For example, if the confidence level of at least one solution reaches a maximum which does not exceed a predetermined level, the KPU 12 may deem such solutions as satisfactory with the maximum confidence level attainable.

The final satisfactory solution is then output by the KPU 12 in step 84. In addition, the final satisfactory solution determined in stp 84 and tentative solutions and results determined in step 78 as well as their associated confidence values generated by the NPU 14 are provided to the KPU 12 to operate in learning mode.

After entering learning mode in step 86, the KPU 12 retrieves programs and objects from its solutions database generated in step 78, and learns strategy and rules from its programs in steps 88 and 90, respectively. The KPU 12 also learns about objects and their attributes in step 92 and learns any relationships between them in step 94. Such learning in steps 88–94 may be performed using AI techniques known in the art such as adaptive and learning neural networks.

Such learned information is stored in the database 24 of the KPU 12 for future use by accessing the database in step 72. Such learned information may then be used to solve similar problems on different objects or different problems with similar objects.

The KPU 12 may also operate an iterative learning mode or an introspection mode; for example, when no problem is posed to the KPU 12, by iteratively executing steps 70–94 on previously stored problems, solutions, and available knowledge to determine additional knowledge to be learned as well as ripple effects and implications; implied relations; solution similarities and preferred strategies.

Figure 4:
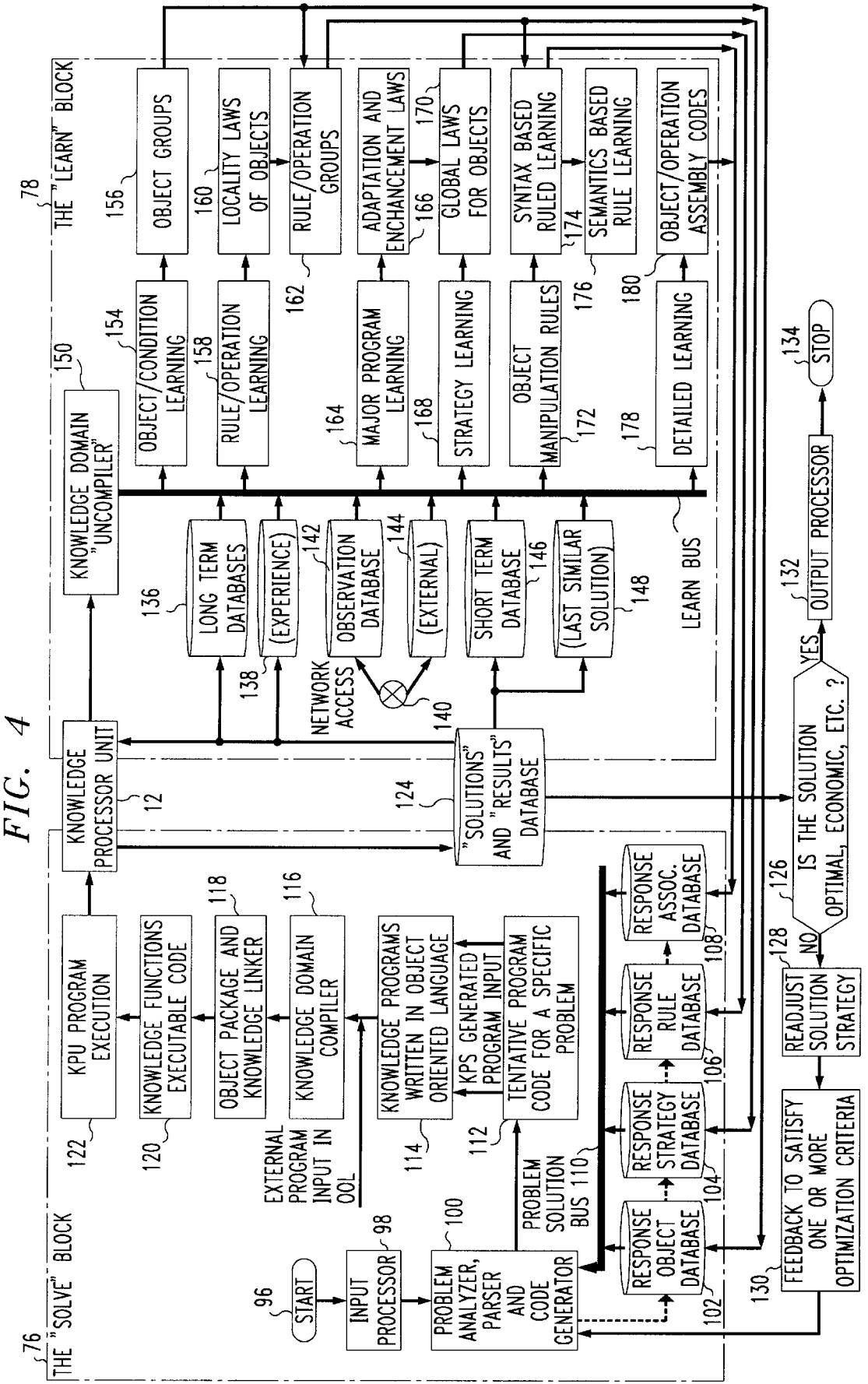
FIG. 4 is a block diagram of the knowledge processing system in greater detail.

The structure of the knowledge processing system 10 is shown in greater detail in FIG. 4 with reference to the operation in FIG. 3. The knowledge processing system 10 starts in step 96 to receive problems, for example, by polling input devices or sensors 56. Upon receiving an input problem at an input processor 98, which corresponds to step 68 in FIG. 3, the problem is processed by a problem analyzer, parser, and code generator 100 which processes the problem. For example, a natural language processor may be used by the problem analyzer, parser, and code generator 100 as in step 70 of FIG. 3, to determine the specific and/or implied objects of the problem which are analyzed, scanned and parsed to analytically clarify the problem to be solved and in what context in which the solution is to be determined.

problem definition specifies some objects for code generation by the KPU 12, and the context of the problem defines boundary conditions for the extent of the searching for a solution to the problem. The results sought define the goal to which the individual steps, executed by knowledge opcodes, are to be directed. Such problem analysis and code generation is shown, for example, in V. Dahle et al., "Logic programming As a Representation of Knowledge", COMPUTER, October 1983, pp. 106–111.

The information obtained is used to query, for example, four or more databases 102–108 operatively connected to the problem analyzer 100 by a problem solution bus 110 to perform step 72 in FIG. 3 to obtain relevant information about the objects, their forward/backward pointers and the rules of operation, i.e. the knowledge opcodes, used with such objects. Global rules from the strategy database 104 are also queried to solve the same or similar problems. If the problem posed to the knowledge processing system 10 is totally new and never before addressed, then an immediate solution is terminated but the objects identified in the problem definition by the problem analyzer 100 are tagged to search an external database, such as other network accessible databases, to find more information on the objects.

The knowledge processing system 10 gathers the information from accessible databases to attempt to solve the problem. When enough information is gathered about the problem from its internal and/or external databases, the knowledge processing system 10 uses a code generator 112 to assemble a sequence of kopcodes 114 as knowledge programs in an object oriented language or directly in system instructions for the KPU 12 to generate the steps in solving the problem, corresponding to step 74 of FIG. 3.

The knowledge programs 114 are combined with external program inputs in an object oriented language to be compiled by a knowledge domain compiler 116, and then linked by an object package and knowledge linker 118 to generate executable code 120 including knowledge functions as a knowledge program 124. The knowledge program 124 is executed by the KPU 12 for generating solutions and results in step 78 in FIG. 3 to be stored in a solutions and results database 124 which is included in the database 24 of the KPU 12.

The solutions and results in the database 124 are analyzed by the NPU 14 to determine the confidence values associated therewith, and the solution is reanalyzed in step 126 by the NPU 14, corresponding to step 80 in FIG. 3, for optimality of execution in terms of optimal confidence criteria, economic criteria, etc., such as 90% confidence against previous stored solutions and/or expert opinions. The results are studied for the optimality of the solution to reach the targeted goal according to the confidence values. Satisfactory solutions are repeated to solve similar problems and assigned a number or confidence value to mark the excellence or lack thereof of the solutions.

The knowledge processing system 10 then iteratively modifies the code in step 82 in FIG. 3 by readjusting a solution strategy in step 128 and providing feedback 130 to the problem analyzer 100 to satisfy one or more optimization criteria to increase the confidence level and to generate a final or best solution and corresponding strategies to be most frequently repeated when the knowledge processing system 10 is in the solve mode. After iteratively generating a satisfactory solution, the solution is sent to an output processor 132 for output to output devices 58 such as a display, and the solving of the problem ends in step 134.

In learning mode, the knowledge processing system 10 employs various techniques for implementing learning processes in the KPU 12. In one embodiment, the KPU 12 performs assembly-level operations on objects, and learns objects forming groups or entities, as well as kopcodes and objects to be used together. Generally, raw and processed information is not wasted by the knowledge processing system 10, since raw information is tied to objects or their attributes, and processed information is associated with the nature and quantity of the new information to be expected based upon the execution of a kopcode upon a specific object.

The knowledge processing system 10 is capable of learning an expected outcome of the execution of a specific kopcode upon an object or group of objects, and the cascading of kopcodes and the relevant object groups to generate complex programs to perform macro knowledge functions is implemented by the knowledge processing system 10 as an advanced learning function.

As shown in FIG. 4, learned information from the learning mode block 78 is stored in the databases 102–108, as well as an optional attribute database for any extensive attribute correlation, searching, etc. used for solving a problem. Information stored in the databases 102–108 is used to solve future problems.

Two types of rules from the rule database 106 are analyzed: local, immediately applicable rules and global, flexible sets of rules. The local rules deal with reflex actions, such as collision avoidance, falling down when humans/robots slip, walking into fire, etc., which are universal rules applicable at all times, and, instead of execution, the attempt to apply such rules flags an error condition. The global, flexible sets of rules deal with analyzing complex programs; for example, in a situation in which a human who may not be an expert in a certain field tolerates an ambiguity in order to learn a process. After continued learning, the human develops the expertise or skill to handle similar complex programs on his/her own. In the context of the KPU 12, such learning of global or long sequences of steps allows the KPU 12 to generate, for example, a program to calculate income tax or similar complex sequence of steps. The KPU 12 is equipped to scan its databases 102–108 until it learns a new strategy or challenges an existing one, which is a process not generally found in conventional CPU environments.

Additional learning methodologies for the KPU 12 are also used to learn certain complex and intricate steps. Systemic approaches for the KPU 12 are used when the learning is aimed at a higher and more global level to deal with the proposed action to follow the process of inference generation. When numerous alternatives exist, the KPU 12 adapts a strategy which the user has adapted in the past. The KPU 12 learns such a strategy by analyzing the past data in the permanent knowledge base or the long-term memory 136 as well as a database of experiences 138. In addition, the external connection 140 may be provided from the KPU 12 to provide network access for receiving external knowledge or data to be stored in an observation database 142 or an external information database 144. Short term memory such as a short term knowledge database 146 as well as a "last similar solution" database 148 are also maintained.

When not solving input problems, the knowledge processing system 10 enters the learning mode by retrieving the knowledge in the databases 136–148 as well as using knowledge from the solutions and results database 124 which is uncompiled by a knowledge domain uncompiler 150; i.e. a device in hardware and/or software for processing stored solutions to generate corresponding goals and subgoals as well as corresponding confidence levels associated with each stored solution. In addition, object functions and kopcodes which were used to generate the solution as well as the interdependencies of the objects used in generating the solution are tracked from a hierarchy of the approach to the solution; i.e., the goals and subgoals which obtained the final solution. For example, extensions of MYCIN are known to be capable of uncompiling solutions.

The knowledge from databases 136–148 and uncompiler 150 are provided through a learning bus 152 to learning modules such as an object/condition learning module 154 for learning object groups 156, a rule/operation learning module 158 for learning locality laws of objects 160 as well as rule/operating groups 162 therefrom, a major program learning module 164 for learning adaptation and enhancement laws 166, a strategy learning module 168 for learning global laws and objects 170 using the adaptation and enhancement laws 166, an object manipulation/rule learning module 172 for learning syntax based rule learning 174 and semantics based rule learning 176 therefrom, and a detailed/local operation rule learning module 178 for learning object/operation assembly codes 180. The learned knowledge 156, 162, 170, 174, 176, and 180 is sent to corresponding databases 102–108 for storage to generate future solutions, as well as to iteratively learn additional knowledge using the learning procedure 78, as described above in conjunction with steps 86–94 in FIG. 3.

The learning process feeds back to the solution process, and the KPU 12 thus accumulates knowledge and grows in its ability to become skilled in solving problems based on previous and/or current solutions to problems.

Strategies may be classified as "risk avoidance", "profit maximization", "minimum cost option", "maximize expected gain", "minimize the maximum expected loss", "maximize the minimum gain", etc. from classic theories in decision making, and the KPU 12 has a basis for its choice of the next step. The solution and learning process of the KPU 12 is accountable for its strategic decision and is unlikely to make numeric errors or to be inexhaustive in its search. In interpreted programs, the method of operation of the knowledge processing system 10 saves considerable amount of dialogue with the user, and the knowledge processing system 10 intelligently associates the syntax, the semantics, and its own previous kopcodes selected.

The knowledge processing system 10 may use considerable latitude in the extent to which learning is achieved. For example, when global procedures are learned, the knowledge processing system 10 scans the knowledge program databases and their libraries to learn strategies, solution charts and diagrams, and major structural relationships between procedural steps. When micro relations between objects and their attributes are learned, the knowledge processing system 10 scans object databases and their libraries to learn the operand (object/event) part of the assembly-level instructions. When micro knowledge instructions are learned, the knowledge processing system 10 scans the kopcodes from encoded programs to associate and to determine which instruction formats and micro functions are feasible with specific group of objects and/or their attributes. To this extent, the coarse and detailed learning process of the knowledge processing system 10 is a highly deterministic and programmed process.

The knowledge processing system 10 executes at least three major types of learning. The first type of learning deals with identifying objects and classifying such objects in the domain of their occurrence or their locales. For example, the object group "food" may be identified and the domain of its occurrence may be tied to kitchens, grocery stores, restaurants, etc. In the same way, the object group "food" is also attributed as being physical, satisfying hunger/thirst, edible, etc. Another example is "income", in which its domain of occurrence from the perspective of the Internal Revenue Service, for example, is tied to earned income, interest and dividends, rental income, etc. In the same manner, the object "income" is also attributed as being assessed, spent, accountable, taxable, etc. Both the identification and the attribute assignment is based on the rules of pattern recognition by which a correlation of the properties of objects with the objects is mapped for future use. This procedure is similar to the subfunction in the compilation phase of a higher language program or routine that a computer system follows. In this case, the knowledge processing system 10 carries out a lexical scanning to detect the "variables" and to separate them by their declarations (i.e., the attributes assigned to such variables) earlier in the program.

The knowledge processing system 10 learns associations and stores the knowledge thus learned. A type of learning is associating objects with other objects by their usual occurrence together. One example involves the Internal Revenue Service being associated with W-2 and 1099 forms, and significant events such as April $15^{TH}$ are associated with 1040's, and so on. The study of the events in the past bear the clues to such associations. Another example of such "object packaging" occurs in software design and drafting packages in which the designer may form a group of objects in the drawing and may collectively move objects together or scale the group in any proportion. The collection of objects exists and operate as a group rather individual items. The context in which the concept becomes important in the KPU 12 functions on the sensing of an "item" to be used in the process which the KPU 12 is attempting. The KPU 12 utilizes the probability that other items of the associated group also are likely to exist and their influence also is to be processed. Locality rules are thus established for items, and functions germane to that group may thus be performed upon the entire group.

When an object gets used in a knowledge program executed by the knowledge processing system 10, the object itself leaves behind backward and forward pointers. A "pointer" is a marker or directional sign which connects one object with another. These pointers indicate which other objects have been used in conjunction with an operation on the object currently in use. Hence, the locality of objects and also the sequentiality of their use is established by the pointers which point to each other in the group. In addition, the operations which were used in previous operations with an object are also available to the learning routines. Both the syntactic learning associated with the object and the semantic learning associated in conjunction with the other associated objects provide acceptable kopcodes for the object or other objects in that group.

A second type of learning deals with the relationships between objects; i.e. an acceptable range of values which may exist for objects in relationship to each other. For example, the IRS (object 1) is highly unlikely to negotiate its tax rates (object 2), but it may be liberal in its interpretation of certain deductions (object 3). Based upon the relationship between the objects, the KPU 12 attempts to follow a tight or relaxed adherence to relationship between the objects. The knowledge processing system 10 first performs a semantic check to determine if operations on the "variables" are consistent with the grammar of the language in which the program or the routine is encoded. Consistent operations and values are acceptable and unacceptable operations are tagged for user information; i.e. the knowledge processing system 10 halts and waits for user input.

The second part of the KPU 12 also dealing with learning encompasses the process of inference generation; i.e. deductive reasoning which permits the KPU 12 to conclude based upon previous knowledge and reasoning, which an outcome may be expected within the bounds of a finite probability. One example of such an inference generation occurs when the IRS is scanning W-2s, in which it also finds an employer verification of the wages reported in the W-2 form. The result of the inference generation leads to the confirmation or denial of the rules and circumstances which led to the inference. The ensuing step depends upon the result, and the functions of the KPU 12 may continue.

A third type of learning deals with modifying the rules upon which major and global actions are based. The KPU 12 learns to modify a rule when it is analyzing the action of the human user and extracting a rationality for his/her actions. When it discovers such a rationality or a reason, the KPU 12 updates its programs in the program databases. If a discrepancy occurs, the KPU 12 brings the discrepancy to the attention of the user and requests clarification to complete its learning process. When the user does not provide the clarification, the matter remains unresolved and the KPU 12 does not perform rationally, so the function of the KPU 12 is temporarily halted.

Figure 5:
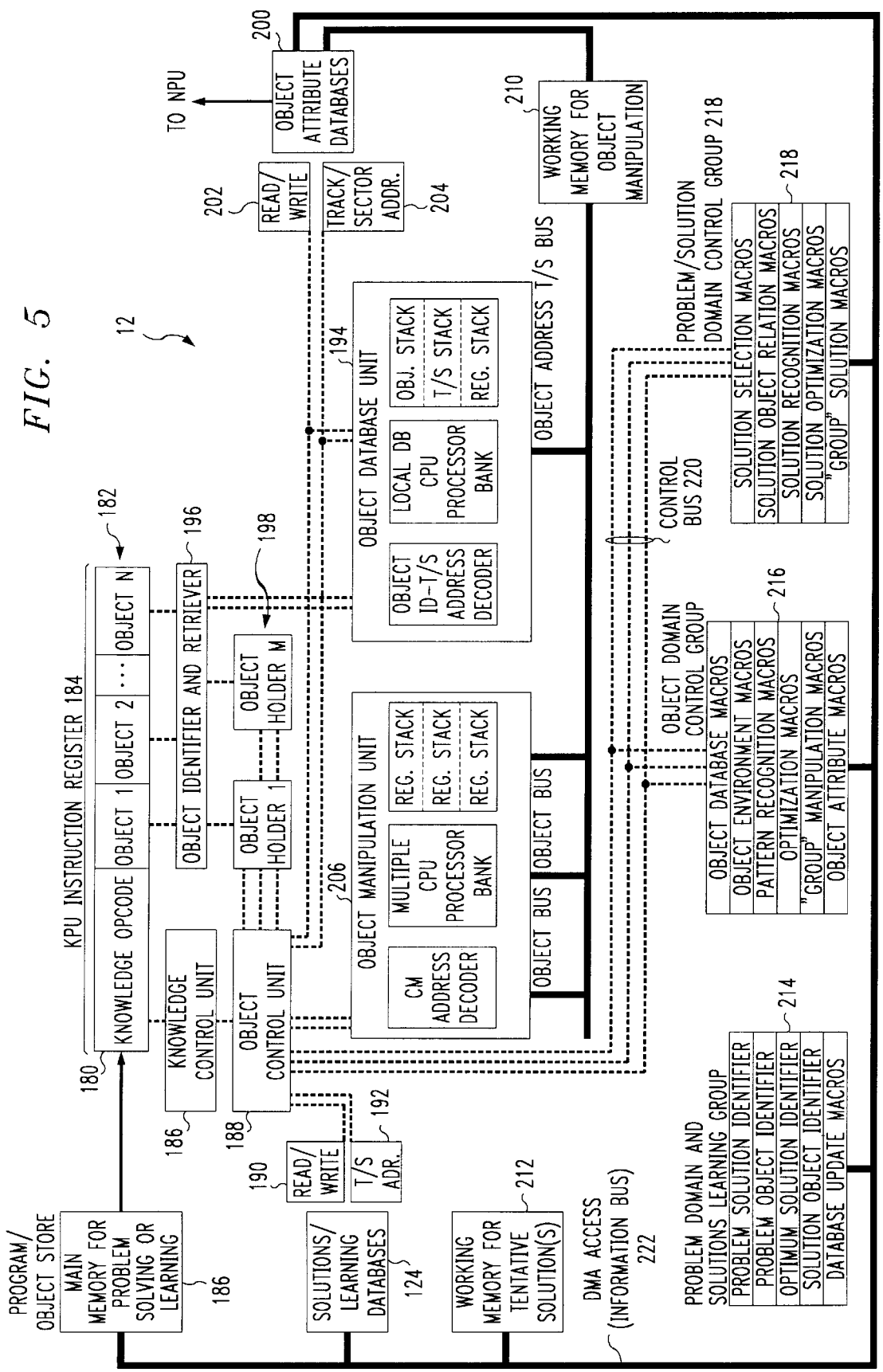
FIG. 5 is a block diagram of a knowledge processing unit.

In an illustrative embodiment, the KPU 12 shown in FIGS. 1 and 4 may be implemented as shown in FIG. 5 using hardware and/or software using single/multiple memories; single bus/multiple bus architectures; object/program cache memories; single/multiple I/O processors and spoolers; etc. In one embodiment, there are two separate sets of primary and secondary memories for programs and objects. Either single knowledge program and object memory architectures or dual banks of memory architectures may be employed such as one for objects and one for programs. The architecture of the traditional von Neumann system having the same memory for programs and data may be employed, as well as parallel processing computers and other non-von Neumann computing architectures.

As shown in FIG. 5, the KPU 12 receives kopcodes 180 and associated objects 182 in a "knowledge word" from a program/object storage devices 186 such as main memory for problem solving and/or learning. The kopcodes 180 and objects 182 are received in a KPU instruction register 184 for processing, which includes parsing the knowledge word to retrieve the kopcode 180 for processing by a knowledge control unit 186 to determine the objects to be processed and controlled by an object control unit 188.

The kopcodes are processed one by one, or alternatively in parallel, to generate a final result. The program or modules to solve the problem input by the user become solutions and the new information and its numeric estimates of confidence levels become the results. The solutions and results; i.e. the modules and associated confidence levels, are stored in the solution and results database 124 by, for example, read/write devices 190 and track/sector (T/S) devices 192. Results are used to re-investigate the optimality of the results. Using such modules, the knowledge processing system 10 operates as an object oriented computer.

The KPU 12 utilizes a knowledge fetch operation to fetch knowledge instructions, such as match, infer, etc., from the main memory for execution of the kopcode 180 in the KPU 12. A secondary fetch may occur when the objects, upon which the knowledge instructions are intended to operate, have a specific address. In response, the objects and their attributes are brought into the KPU 12 from, for example, the DBU 16.

The fetch operation of the KPU 12 is a dual fetch; i.e. objects are sent to the object database unit 194 of the KPU 12 through an object identifier and retrieve register 96 is and object holders 198, and corresponding numbers representing probabilities or confidence levels are sent to the NPU 14 through, for example, an object attribute database 200. The object attribute database 200 receives the confidence levels as attributes of the objects and which are written by a read/write device 202 or a track/sector address device 204. Both the KPU 12 and the NPU 14 perform a micro knowledge function during the execution of the kopcode.

Object cache memories are provided in, for example, the object database unit 194, using VLSI RAM or a cache RAM organized as a data structure or table of numbers or word attributes. In one embodiment. cache RAM may be organized into numerous columns, with a first column having an object identifier number, and other columns including representations of antecedent and precedent objects, contextual objects to which that particular object has been linked in the past, as well as numerical values of confidence in association with this particular object; and object attributes with the numerical value in the confidence level relating the object with that attribute.

Main object memories may also be provided to have object environments (OEs) of any objects participating in the knowledge processing of a knowledge program. Long-term object databases supplement the object memories, and networks may provide OEs from distant object databases or logically joined knowledge processing environments.

An object manipulation unit 206 is used to control the processing of the objects with the object database unit 194 using a common object bus 208 and a common working memory for object manipulation 210. Each of the object database unit 194 and the object manipulation unit 206 includes respective CPU processors in banks, and respective stacks 214 for processing objects. Common or often used objects are stored and manipulated in a cache-like manner in stacks.

The KPU 12 decodes the kopcodes to process information according to the mode of operation of the KPU 12; i.e. an execute/solve mode or a learning mode, as well as processing the information according to its type. A set of specific kopcodes is defined for each of the subfunctions within the solve and learning modes of the KPU 12.

During the execution of a kopcode in the KPU 12, the mode of operation is identified, the type of kopcode is identified, and appropriate attributes within the OE of the objects involved are processed. The OE of that object is enhanced and updated to facilitate execution by that particular knowledge microfunction. Hence, the kopcodes modify the OE of the operand objects.

Each kopcode modifies the OE of one or more objects or generates new information about a new or existing object. The operands of the kopcodes are the objects or conditions. The KPU 12 performs assembly-level instructions on objects or object environments.

After decoding the kopcode, the actual knowledge domain function associated with the kopcode proceeds by a decomposition of the kopcode into its hardware functions on objects and memory locations thereof. The object control unit 188 of the KPU 12 then dispatches control signals to perform functions within the KPU 12; for example, to interpret microcode within the KPU 12. For complex kopcodes, macro-assembly routines may be performed. Kopcodes may depend upon the execution of other kopcodes, and once a basic set of independent kopcodes is identified, the knowledge processing system 10 is boot-strapped from its fundamental independent instructions.

The decomposition of a single knowledge domain macro function into a group of kopcodes is as important as the decomposition of a complex knowledge domain function into its macros. The three operations; i.e. decomposition of major knowledge domain function, programmable structure of the solution, and the system realizability of every knowledge micro function, are used for programming the knowledge processing system 10 and for writing knowledge utilities. The knowledge processing system 10 performs the decomposition of objectives, generalization of steps in solution, and then the recomposition of discrete steps to obtain a specific solution to a problem, with tentative solutions stored in a working memory 212 for tentative solutions. Micro modules are organized into a first level of a modular hierarchy, and then the modules are organized into the next level and so on. During operation, it is often necessary to modify or enhance the knowledge processing rules to suit the context or the level. Kopcodes are written for each major knowledge domain function and each kopcode is an assembly of other microscopic system realizable sub-functions or instructions.

For example, the kopcode for "find the common attributes of" object X and object Y may be processed by having the KPU 12 invoke a database search for the attributes of objects X and Y. The KPU 12 then performs attribute matching for the attributes as defined for X and for Y. If a commonality is apparent and certain, then the result is reported with a 100 percent level of confidence. If the commonality is latent or indirect, for example, through attributes of attributes, or if there is any ambiguity in the matching of the attributes, then the result is reported with a computed less-than-100 percent level of confidence. It is also possible to do a search of objects that may have a greatest overlap of the attributes of one object leading to a third type of knowledge sub-function.

For performing solve and learning modes, groups of identifiers and macros or modules are provided in the KPU 12. For example, a problem domain and solutions learning group 214 may include modules for identifying problem solutions, problem objects, optimum solutions, and solution objects as well as a macro for updating databases associated with the KPU 12. An object domain control group 216 may be included which has macros for controlling the storing of objects in a database, for controlling the OE of an object, for performing pattern recognition using AI techniques, for optimizing the solution in view of the associated confidence levels, for manipulating groups of objects, and for controlling the processing of object attributes such as storing object attributes in the object attribute database 200.

A problem/solution domain control group 218 may be included which has macros for controlling, for example, the selection of solutions, the determination of solution object relations, the recognition of solutions, the optimization of solutions in view of the confidence levels, and the determination of a solution associated with a group of objects. The object domain control group 216 and the problem/solution domain control group 218 are controlled by the object control unit 188 via control signals from a control bus 220, and the groups 214–218 are also connected to other components by a DMA information bus 222.

The learning mode permits the KPU 12 to enhance or enrich the OE of objects. An initial OE of objects acts as a basic knowledge level about the objects in general. Typically, the OE for the attributes of participating objects stored in a tabular form may be read from dictionaries, databases including technical papers, specialized documents describing objects, etc.

Object attributes are classified by the KPU 12. For example, in the telecommunication environment, a service control point (SCP) maintains a limited amount of customer information and the network information in its databases, and the information is maintained and updated by the operator in the service management system (SMS) for the databases in a service creation environment (SCE).

Sets of OE details about a subset of related objects is maintained in the databases of the knowledge processing system 10. For example, in an application of the knowledge processing system 10 implementing an integrated medical system, the OEs of the various objects, such as patients, doctors, pharmacists, surgeons, patient rooms, nurses, etc., are provided or built. The KPU 12 then executes a knowledge program, such as a program for finding emergency procedures for third-degree burn patients, and giving an optimal procedure depending upon the most current objects such as doctors, pharmacists, surgeons, patient rooms, nurses, patient insurance, etc.; their availability, time of the day, day of the week; and any number of additional constraints which people who wrote the SCPs may not have foreseen.

For storing objects, a declaration of object type and the type or destination of storage of the object determines how the object is stored. After a knowledge program is executed, the knowledge processing system 10 alters and enhances the OE, including associated confidence levels, of participating objects altered and enhanced. In addition, OEs of new objects are defined or composed, thus allowing the knowledge processing system 10 to identify objects not previously envisioned in the problem formulation. Simple deductions or major conclusions may be drawn depending upon the program. The reasoning may be so fine that a known result is a single and well-defined certainty. Conversely, the programming may be so vague that a large number of results and solutions may be drawn, each with its own level of certainty or uncertainty. The knowledge processing system 10 may have to perform a more extensive search; i.e. dig deeper, into its own knowledge bases or seek external databases for objects, related objects, probable objects, precedent objects, antecedent objects and all related objects to solve the problem. Validation or disputation of a hypothesis is also programmed. The knowledge processing system 10 then identifies the probability of the hypothesis based upon the information available for the objects and their attributes.

While the disclosed knowledge processing system and method have been particularly shown and described with reference to the preferred embodiments, it is understood by those skilled in the art that various modifications in form and detail may be made therein without departing from the scope and spirit of the invention. Accordingly, modifications such as those suggested above, but not limited thereto, are to be considered within the scope of the invention.

What is claimed is:

1. A knowledge processing system comprising:
    a memory for storing knowledge in a plurality of knowledge modules in a knowledge bank, the knowledge including data associated with preexisting solutions to previous problems; and
    a processing unit for receiving sensory signals from an external device, the sensory signals including problem-related data corresponding to a current problem, the processing unit operating knowledge-based software and including:
        a knowledge processing unit for generating a plurality of artificial intelligence based modules by processing the current problem using a natural language processor to generate tentative code, and for executing the plurality of artificial intelligence based modules to process the input signals representing data, including problem related data corresponding to the current problem, for generating a plurality of solution-related modules from the data representing the pre-existing solutions, with the solution-related modules corresponding to solutions to the current problem;
        a numerical processing unit for generating a confidence level associated with a respective solution to the current problem by applying the tentative code to the current problem and generating, the confidence level from a tentative solution corresponding to the tentative code; and
    a database processing unit for controlling the storing of the solution-related modules in the memory;
    wherein the knowledge processing unit, responsive to the confidence levels of the solutions, iteratively revises the solutions to generate an optimal solution to the current problem by determining a solution strategy using the confidence level corresponding to the tentative solution and adjusting the solution strategy to increase corresponding confidence levels the optimal solution being transmitted as data signals to at least one device.

2. The knowledge processing system of claim 1 wherein the knowledge processing unit iteratively revises the solutions until an optimal solution is generated having an associated confidence level above a predetermined value.

3. The knowledge processing system of claim 1 wherein the knowledge processing unit iteratively revises the solutions until an optimal solution is generated having an associated confidence level having a maximum value of the confidence levels of the solutions.

4. The knowledge processing system of claim 1 wherein the knowledge processing unit generates the plurality of artificial intelligence based modules using a set of predetermined knowledge operation mappings, including knowledge opcodes (kopcodes), between goals associated with the current problem.

5. The knowledge processing system of claim 4 wherein the knowledge processing unit operates the kopcodes on at least one goal as a knowledge operand, the at least one goal included in the solutions to the current problem.

6. The knowledge processing system of claim 5 wherein the knowledge processing unit operates at least one kopcode to perform a knowledge domain function on at least one goal.

7. The knowledge processing system of claim 5 wherein the knowledge processing unit operates at least one kopcode to retrieve attributes of goals.

8. The knowledge processing system of claim 5 wherein the knowledge processing unit operates at least one kopcode to retrieve forward or backward pointers for performing knowledge domain functions.

9. The knowledge processing system of claim 1 wherein the numerical processing unit tracks confidence levels associated with a set of knowledge microfunctions included in the plurality of solution-related modules to generate an overall confidence level associated with the solution of the current problem.

10. The knowledge processing system of claim 9 wherein the numerical processing unit includes a multiplier for evaluating a product of a plurality of confidence levels to determine the overall confidence level of the solution.

11. A network for processing knowledge comprising:
    a sensor for receiving sensory signals from an external device, the sensory signals including problem-related data corresponding to a current problem;
    at least one output device for transmitting data signals to the external device;
    a memory for storing knowledge in a plurality of knowledge modules in a knowledge bank, the knowledge including data associated with preexisting solutions to previous problems; and
    a processing unit, operating knowledge-based software, the processing unit including:
        a knowledge processing unit for generating a plurality of artificial intelligence based modules by processing the current problem using a natural language processor to generate tentative code, the knowledge processing unit executing the plurality of artificial intelligence based modules to process the sensory signals, including the problem-related data, for generating a plurality of solution-related modules from the data representing the pre-existing solutions, with the solution-related modules corresponding to solutions to the current problem;
        a numerical processing unit for generating a confidence level associated with a respective solution to the current problem by applying the tentative code to the current problem and generating the confidence level from a tentative solution corresponding to the tentative code; and
        a database processing unit for controlling the storing of the solution-related modules in the memory;
    wherein the knowledge processing unit, responsive to the confidence levels of the solutions, iteratively revises the solutions to generate an optimal solution to the current problem by determining a solution strategy using the confidence level corresponding to the tentative solution and adjusting the solution strategy to increase corresponding confidence levels, the optimal solution being output as the data signals by the output device to the external device.

12. The network of claim 11 wherein the knowledge processing unit iteratively revises the solutions until an optimal solution is generated having an associated confidence level above a predetermined value; and
    the output device outputs the solution to the external for generating a feedback signal to the sensors.

13. The network of claim 11 wherein the knowledge processing unit iteratively revises the solutions until an optimal solution is generated having an associated confidence level having a maximum value of the confidence levels of the solutions for providing optimal control of the external device.

14. A method for processing knowledge comprising the steps of:
    storing knowledge in a plurality of knowledge modules in a knowledge bank, the knowledge including data associated with pre-existing solutions to previous problems;
    generating a plurality of artificial intelligence based modules in response to sensory signals transmitted by an external device, the sensory signals including problem-related data corresponding to a current problem and being received by a sensor, the plurality of artificial intelligence based modules being generated by processing the current problem using a natural language processor to generate tentative code;
    executing the plurality of artificial intelligence base modules to process the input signals representing data, including problem related data corresponding to the current problem;
    generating a plurality of solution-related modules from the data representing the pre-existing solutions, with the solution-related modules corresponding to solutions to the current problem;
    generating a confidence level associated with a respective solution to the current problem using a numerical processing unit and applying the tentative code to the current problem and generating the confidence level from a tentative solution corresponding to the tentative code; and
    iteratively revising the solutions using the confidence levels to generate an optimal solution to the current problem by determining a solution strategy using the confidence level corresponding to the tentative solution and adjusting the solution strategy to increase corresponding confidence levels, the optimal solution being transmitted as data signals to at least one device.

15. The method of claim 14 wherein the step of iteratively revising the solutions includes the step of:
    iteratively revising until an optimal solution is generated having an associated confidence level above a predetermined value.

16. The method of claim 14 wherein the step of iteratively revising the solutions includes the step of:
    iteratively revising until an optimal solution is generated having an associated confidence level having a maximum value of the confidence levels of the solutions.

17. The method of claim 14 wherein the step of processing the current problem using a natural language processor to generate tentative code includes the steps of:

determining goals and subgoals of the current problem; and generating a set of predetermined knowledge operation mappings, including knowledge opcodes (kopcodes), between goals associated with the current problem.

18. The knowledge processing system of claim 1 wherein said system is configured as an expert system, said knowledge including data associated with pre-existing solutions to previous problems being knowledge of a human expert.

19. The method of claim 14 wherein said method is operative in an expert system, said knowledge including data associated with pre-existing solutions to previous problems comprises knowledge of a human expert, and said method further comprises the step of communicating said optimal solution to a user of the expert system.

20. The network of claim 11 wherein the knowledge processing unit is adapted to read just a solution strategy in order to iteratively revise said solutions.

* * * * *